(12) United States Patent
Singh et al.

(10) Patent No.: US 12,341,874 B2
(45) Date of Patent: Jun. 24, 2025

(54) SECURE DATA MIGRATION SERVICE ACROSS ON-PREMISE AND MULTI-CLOUD ENVIRONMENT(S)

(71) Applicant: Dell Products L.P., Round Rock, TX (US)

(72) Inventors: Ankit Singh, Ka (IN); Deepaganesh Paulraj, Ka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 192 days.

(21) Appl. No.: 18/154,663

(22) Filed: Jan. 13, 2023

(65) Prior Publication Data

US 2024/0243903 A1 Jul. 18, 2024

(51) Int. Cl.
*H04L 9/08* (2006.01)
*H04L 9/40* (2022.01)

(52) U.S. Cl.
CPC ........ *H04L 9/0822* (2013.01); *H04L 63/0428* (2013.01)

(58) Field of Classification Search
CPC ............. H04L 9/0822; H04L 63/0428
See application file for complete search history.

(56) References Cited

U.S. PATENT DOCUMENTS

2020/0242711 A1* 7/2020 Cao .............. H04L 9/0894
2023/0403134 A1* 12/2023 French ............... H04L 9/14

OTHER PUBLICATIONS

"Is there an encryption method where the order of decryption is irrelevant to the order of encryption?" Cryptography. [https://crypto.stackexchange.com/questions/41328/is-there-an-encryptionmethod-where-the-order-of-decryption-is-irrelevant-to-the] retrieved Oct. 4, 2022, 2 pages.
"Stream cipher" Wikipedia. [https://en.wikipedia.org/wiki/Stream_cipher] retrieved Oct. 18, 2024, 8 pages.
"Block cipher mode of operation" Wikipedia. [https://en.wikipedia.org/wiki/Block_cipher_mode_of_operation] retrieved Oct. 18, 2024, 23 pages.

* cited by examiner

*Primary Examiner* — Kevin Bechtel
*Assistant Examiner* — Forrest L Carey
(74) *Attorney, Agent, or Firm* — Amin, Turocy & Watson, LLP

(57) ABSTRACT

Embodiments for a secure data migration service across on-premise and multi-cloud environment(s). are presented herein. A first service encrypts data using a first encryption key to obtain a first version of encrypted data; sends the first version of encrypted data to a second service; and receives, from the second service, a second version of encrypted data—the second version of encrypted data comprising the first version of encrypted data having been further encrypted with a second encryption key corresponding to the second service. The first service further decrypts the second version of encrypted data using the first encryption key to obtain a third version of encrypted data being encrypted with the second encryption key; and sends the third version of encrypted data to the second service to facilitate decryption, using the second encryption key, of the third version of encrypted data to obtain the data.

20 Claims, 14 Drawing Sheets

SECURE DATA MIGRATION SERVICE ACROSS ON-PREMISE AND MULTI-CLOUD ENVIRONMENT(S)

TECHNICAL FIELD

The subject disclosure generally relates to embodiments for a secure data migration service across on-premise and multi-cloud environment(s).

BACKGROUND

Data transfer applications can utilize multiple protocol(s), e.g., hypertext transfer protocol secure (HTTPS), to encrypt data that is transferred between devices. When a secure data transfer application is not installed, and/or operable, on both of the devices, e.g., at least one of the devices has crashed or only has a bare operating system installed, i.e., without any applications, then unsecure data protocols/operations such as file transfer protocol (FTP) or direct memory access (DMA) are utilized to transfer data between the devices. Consequently, conventional data transfer technologies have had some drawbacks, some of which may be noted with reference to the various embodiments described herein below.

BRIEF DESCRIPTION OF THE DRAWINGS

Non-limiting embodiments of the subject disclosure are described with reference to the following Figures, wherein like reference numerals refer to like parts throughout the various views unless otherwise specified.

DETAILED DESCRIPTION

Figure 1:
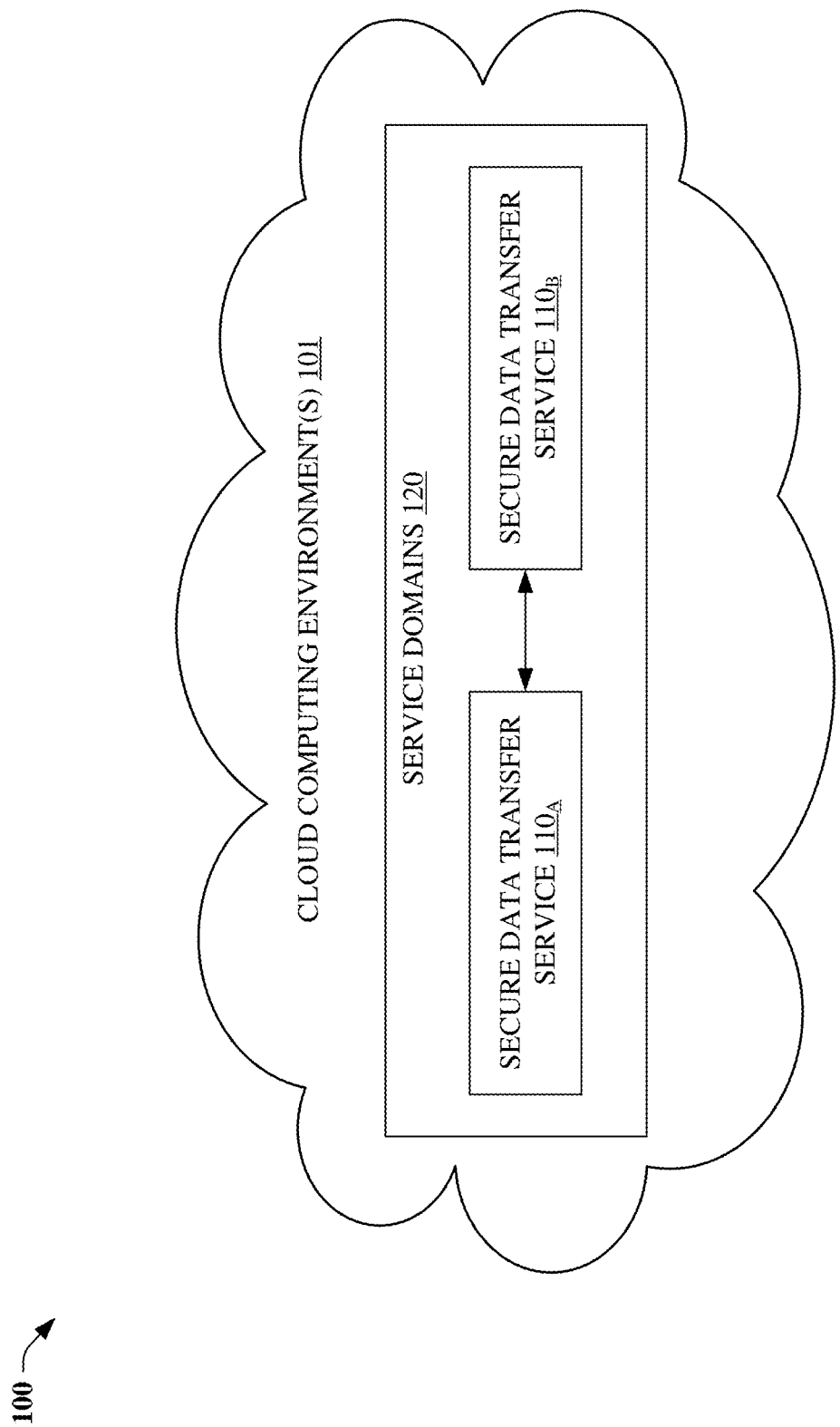
FIG. 1 illustrates a block diagram of cloud computing environment(s) facilitating secure data migration service(s) across and/or within different service domains, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional data transfer technologies have had some drawbacks with respect to transferring data when secure data transfer application(s) cannot be utilized, e.g., during data recovery from a device that has crashed; before installation of such application(s) on the device. Various embodiments disclosed herein can facilitate secure data migration across on-premise and multi-cloud environment(s) by facilitating, e.g., via secure data transfer services, performance of respective encoding/decoding operations using cipher keys corresponding to the secure data services.

For example, in embodiment(s), a system can comprise a processor and a memory that stores executable components that, when executed by the processor, facilitate performance of operations by the system, the operations comprising: encrypting, by a first data service of the system, data using a first encryption key to obtain a first version of encrypted data; sending, by the first data service, the first version of encrypted data to a second data service; receiving, by the first data service from the second data service, a second version of encrypted data, wherein the second version of encrypted data comprises the first version of encrypted data having been further encrypted with a second encryption key corresponding to the second service; decrypting, by the first data service, the second version of encrypted data using the first encryption key to obtain a third version of encrypted data being encrypted with the second encryption key; and sending, by the first data service, the third version of encrypted data to the second service to facilitate decryption, using the second encryption key, of the third version of encrypted data to obtain the data.

In embodiment(s), the data comprises raw data, unstructured data, an encryption key, encrypted data, or non-persistent data.

In other embodiment(s), the first encryption key is different than the second encryption key.

In yet another embodiment(s), the first encryption key equals the second encryption key.

In embodiment(s), the first encryption key and the second encryption key comprise symmetric cipher keys to facilitate performance of encryption or decryption operations in any sequence.

In other embodiment(s), the data comprises a shared encryption key, and the encrypting of the data comprises: encrypting, by the first data service, the shared encryption key using the first encryption key to obtain the first version of encrypted data; encrypting, by the first data service, raw data using the shared encryption key to obtain encrypted raw data; and sending, by the first data service, the encrypted raw data to the second data service to facilitate a decryption, via the second service using the shared encryption key, of the encrypted raw data to obtain the raw data.

In other embodiment(s), the shared encryption key is the first encryption key. In yet other embodiment(s), the shared encryption key is different than the first encryption key.

In embodiment(s), the raw data comprises unstructured data, an encryption key, encrypted data, or non-persistent data.

In other embodiment(s), the first encryption key, the second encryption key, and the shared encryption key comprise respective symmetric cipher keys to facilitate performance of encryption or decryption operations in any sequence.

In embodiment(s), the data and/or raw data corresponds to a transfer of an application. In other embodiment(s), the data and/or raw corresponds to a transfer of a virtual machine.

In other embodiment(s), the first data service and/or the second data service corresponds to a cloud-based storage device.

In yet other embodiment(s), a device of the system comprises the first data service and the second data service.

In embodiment(s), a method comprises: using a shared cipher key, encrypting, by a first service of a system comprising a processor, data to obtain encrypted data; sending, by the first service, the encrypted data to a second service; using a first cipher key, encrypting, by the first service, the shared cipher key to obtain first encrypted cipher data; sending, by the first service, the first encrypted cipher data to the second service; and receiving, by the first service from the second service, second encrypted cipher data comprising the first encrypted cipher data that has been encrypted with the first cipher key and a second cipher key.

In turn, the method further comprises: using the first cipher key, decrypting, by the first service, the second encrypted cipher data to obtain third encrypted cipher data that is encrypted with the second cipher key; and sending, by the first service, the third encrypted cipher data to the second service to facilitate a first second service decryption, using the second cipher key, of the third encrypted cipher data to obtain the shared cipher key, and to further facilitate a second service decryption, using the shared cipher key, of the encrypted data to obtain the data.

In other embodiment(s), the encrypting of the data comprises: encrypting, by the first service, one or more portions of non-persistent data corresponding to a virtual machine.

In yet other embodiment(s), the first service and/or the second service comprise middleware representing performance of non-operating system-based services.

In embodiment(s), the first cipher key and the second cipher key comprise symmetric cipher keys to facilitate performance of encryption or decryption operations in any sequence.

In other embodiment(s), a system can comprise a processor and a memory that stores executable components that, when executed by the processor, facilitate performance of operations by the system, the operations comprising: receiving, by a first data service of the system from a second data service, a first version of encrypted data comprising unencrypted data that has been encrypted using a first encryption key; encrypting, by the first data service, using a second encryption key, the first version of encrypted data to obtain a second version of encrypted data that has been encrypted with the first encryption key and the second encryption key; and sending, by the first data service, the second version of encrypted data to the second data service.

The method further comprises: receiving, by the first data service from the second data service, a third version of encrypted data, in which the third version of encrypted data comprises a decrypted version of the second version of encrypted data being encrypted with the second encryption key; and decrypting, by the first data service using the second encryption key, the third version of encrypted data to obtain the unencrypted data.

In yet other embodiment(s), a non-transitory machine-readable medium comprises instructions that, in response to execution, cause a first service corresponding to a system comprising a processor to perform operations, the operations comprising: in response to encrypting unencrypted data using a shared cipher key to obtain encrypted data, sending the encrypted data to a second service; encrypting the shared cipher key using a first cipher key to obtain first encrypted cipher data; in response to sending the first encrypted cipher data to the second service, receiving second encrypted cipher data from the second service—the second encrypted cipher data comprising the first encrypted cipher data being encrypted with the first cipher key and a second cipher key corresponding to the second service; decrypting the second encrypted cipher data using the first cipher key to obtain third encrypted cipher data being encrypted with the second cipher key; and sending the third encrypted cipher data to the second service to facilitate a first decryption, via the second service, of the third encrypted cipher data using the second cipher key to obtain the shared cipher key, and a second decryption, via the second service, of the encrypted data using the shared cipher key to obtain the data.

In embodiment(s), the first cipher key and the second cipher key comprise symmetric cipher keys to facilitate performance of encryption or decryption in any order of operations.

Data migration, e.g., data transfer, in cloud computing service(s) corresponding to, e.g., an on-premises service, infrastructure as a service (IaaS), platform as a service (PaaS), and software as a service (SaaS), is a process of transferring data from one system to another system to affect a change in storage, a database, or an application. Typically, data migration occurs during an upgrade of existing hardware, or during transfer of data to a completely new system. Examples include migrating data to/from a hardware platform; upgrading a database; migrating to new software; or merging parallel systems in one system.

Conventional data transfer and/or migration between disk-based storage is suspectable to being compromised, e.g., when secure data transfer application(s) cannot be utilized (e.g., during data recovery from a device that has crashed, before installation of such application(s) on the device); when data encrypted with a unique master encryption key (MEK) corresponding to the device is transferred to another storage device that does not have access to the MEK, and therefore cannot decrypt the encrypted data after it was received.

On the other hand, various embodiments disclosed herein can facilitate secure data migration across on-premise and multi-cloud environment(s) by facilitating, e.g., via secure data transfer services, performance of respective encoding/decoding operations using cipher keys, e.g., synchronous stream cipher keys, corresponding to the secure data services.

Figure 2:
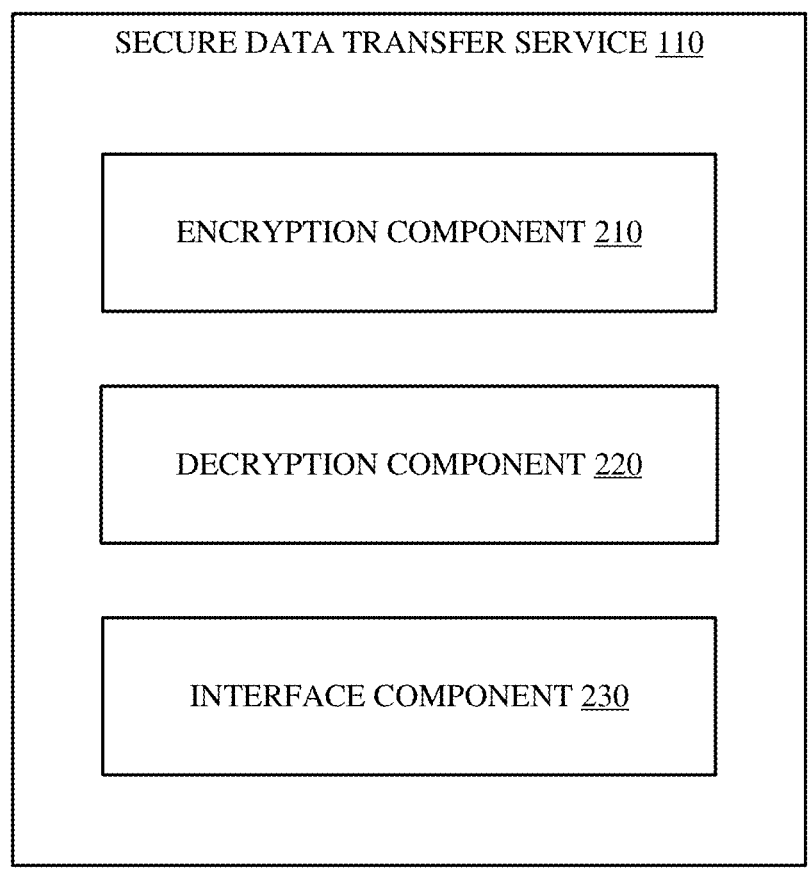
FIG. 2 illustrates a block diagram of a secure data transfer service that facilitates secure data migration across and/or within different service domains, in accordance with various example embodiments.
Figure 3:
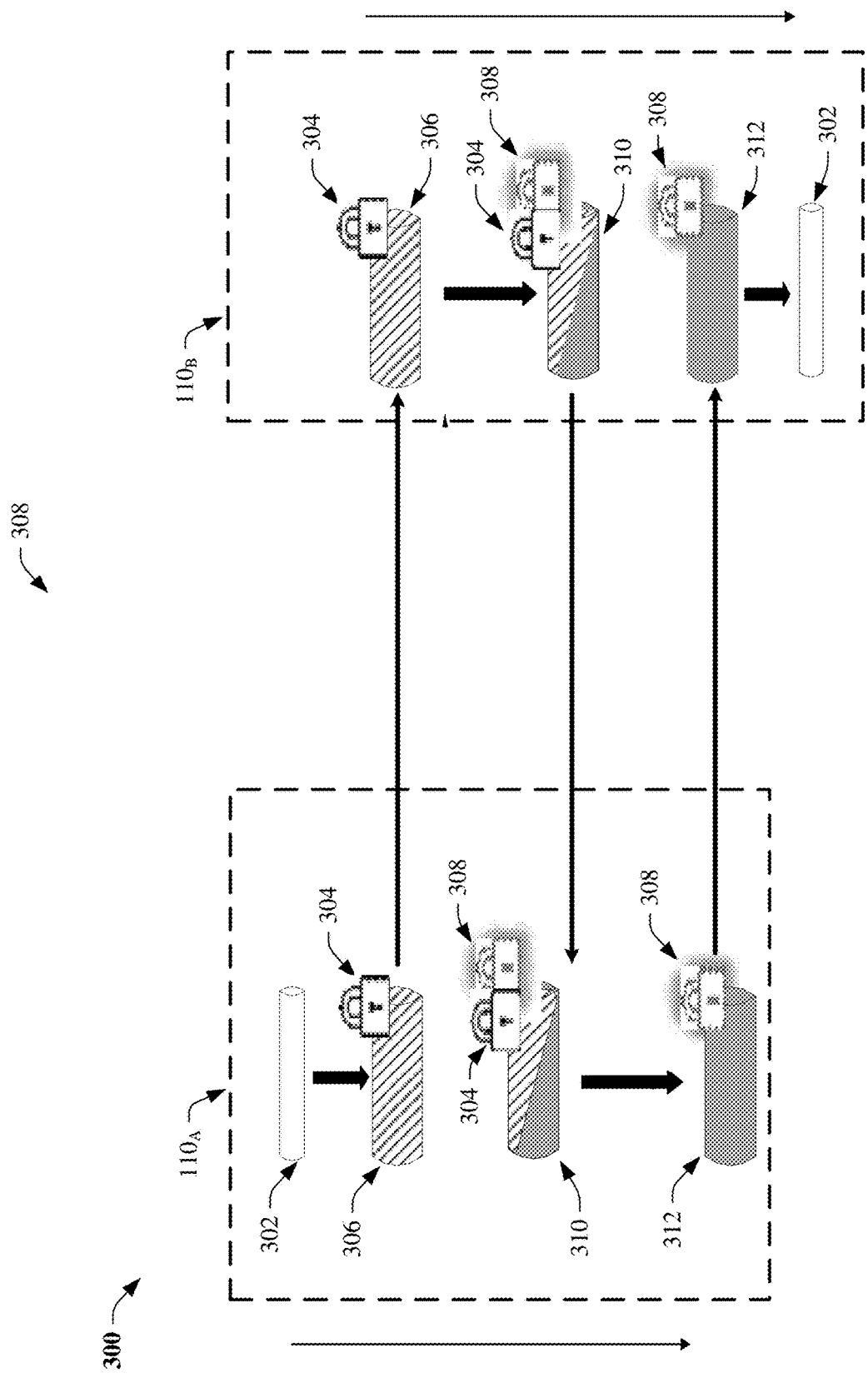
FIG. 3 illustrates a block diagram of s secure data transfer of encrypted data between services to facilitate secure data migration across and/or within different service domains, in accordance with various example embodiments.

Referring now to FIGS. 1-3, block diagrams (100-300) of cloud computing environment(s) facilitating secure data migration service(s) across and/or within different service domains; a data transfer service, e.g., a secure data transfer service (110) (e.g., 110$_A$, 110$_B$) that facilitates secure data migration across and/or within different service domains; and a secure data transfer of encrypted data between services (110$_A$ and 110$_B$) to facilitate secure data migration across and/or within different service domains are illustrated, respectively, in accordance with various example embodiments.

The secure data transfer services, e.g., a first data service (e.g., $110_A$, $110_B$) and a second data service (e.g., $110_B$, $110_A$), are included in a system (not shown), e.g., comprising computing system (1400) that is included in cloud computing environment(s) (101). The first data service and the second data service comprise an encryption component (210), a decryption component (220), and an interface component (230), an can be implemented as middleware, e.g., a type of computer software that provides services, e.g., to software applications or other service domains (see, e.g., FIG. 5 described below), beyond those available from an operating system or other domain(s) of the service domains, e.g., an on-premises service, IaaS, PaaS, and/or SaaS.

An encryption component of the first data service encrypts data (302) using a first encryption key (304), cipher key, to obtain a first version of encrypted data (306), and sends, via an interface component of the first data service, the first version of encrypted data to the second data service.

In turn, the second data service receives, via an interface component of the second data service, the first version of encrypted data; and an encryption component of the second data service encrypts the first version of encrypted data using a second encryption key (308), or cipher key, to obtain a second version of encrypted data (310).

The interface component of the second data transfer service sends the second version of the encrypted data to the first data service. The interface component of the first data service receives the second version of encrypted data from the second data service—the second version of encrypted data comprising the first version of encrypted data having been further encrypted, by the second data service, with the second encryption key.

The decryption component of the first data service decrypts the second version of encrypted data using the first encryption key to obtain a third version of encrypted data (312) being encrypted with the second encryption key. In turn, the interface component of the first data transfer service sends the third version of encrypted data to the second data service.

The interface component of the second data service receives the third version of encrypted data, and the decryption component of the second data service decrypts, using the second encryption key, the third version of encrypted data to obtain the data (302).

In embodiment(s), the data comprises raw data, unstructured data, an encryption key, encrypted data, or non-persistent data. In other embodiment(s), the first encryption key is different than the second encryption key. In yet another embodiment(s), the first encryption key equals the second encryption key.

In other embodiment(s), the first encryption key and the second encryption key comprise symmetric cipher keys, e.g., corresponding to a synchronous stream cipher, to facilitate performance of encryption or decryption operations, e.g., based on exclusive-or (XOR) masks used to encrypt/decrypt data (e.g., a stream of data), in any sequence.

Figure 4:
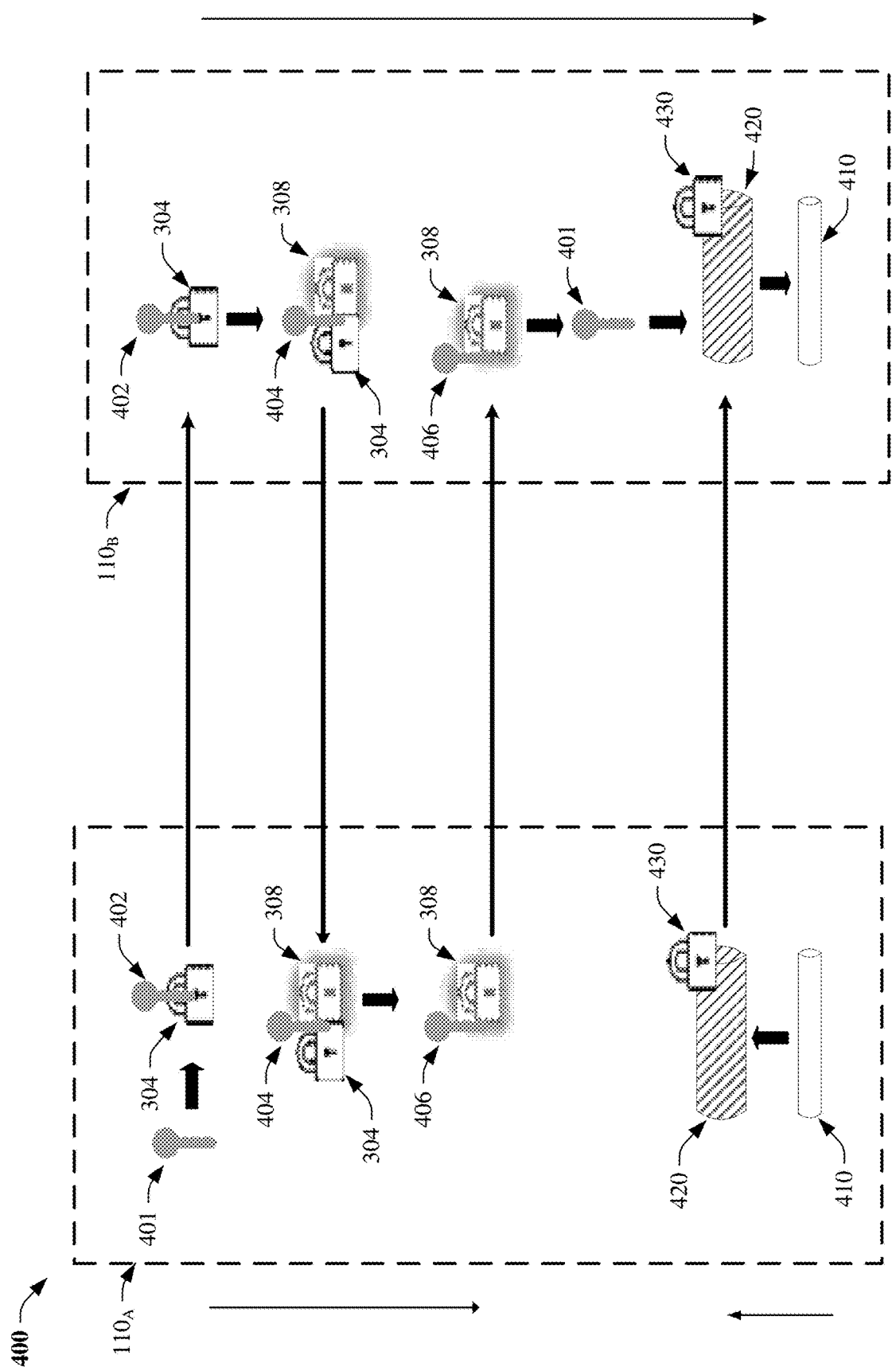
FIG. 4 illustrates a block diagram of secure data transfer of encrypted cipher data between services to facilitate secure data migration across and/or within different service domains, in accordance with various example embodiments.

Referring now to FIG. 4, in embodiment(s), the data comprises a shared encryption key (401). In this regard, the encryption component of the first data service encrypts the shared encryption key using the first encryption key (304) to obtain the first version of encrypted data (402), e.g., comprising a first version of encrypted cipher data.

The interface component of the first data service sends the first version of encrypted cipher data to the second data service. The interface component of the second data service receives the first version of encrypted cipher data; and the encryption component of the second data service encrypts the first version of encrypted cipher data using a second encryption key (308) to obtain a second version of encrypted cipher data (404).

The interface component of the second data transfer service sends the second version of encrypted cipher data to the first data service. The interface component of the first data service receives the second version of encrypted cipher data from the second data service—the second version of encrypted cipher data comprising the first version of encrypted cipher data having been further encrypted, by the second data service, with the second encryption key.

The decryption component of the first data service decrypts the second version of encrypted cipher data using the first encryption key to obtain a third version of encrypted cipher data (406) being encrypted with the second encryption key. In turn, the interface component of the first data transfer service sends the third version of encrypted cipher data to the second data service.

The interface component of the second data service receives the third version of encrypted cipher data, and the decryption component of the second data service decrypts, using the second encryption key, the third version of encrypted cipher data to obtain the shared encryption key (401).

Further, the encryption component of the first data service encrypts raw data (410) using the shared encryption key (401) to obtain encrypted raw data (420) comprising cipher data (430), and the interface component of the first data service sends the encrypted raw data to the second data service.

In turn, the interface component of the second data service receives the encrypted raw data that has been encrypted with the shared encryption key; and the decryption component of the second data service decrypts the encrypted raw data using the shared encryption key to obtain the raw data (410).

In other embodiment(s), the shared encryption key is the first encryption key. In yet other embodiment(s), the shared encryption key is different than the first encryption key.

In embodiment(s), the raw data comprises unstructured data, an encryption key, encrypted data, or non-persistent data.

In other embodiment(s), the first encryption key, the second encryption key, and the shared encryption key comprise respective symmetric cipher keys to facilitate performance of encryption or decryption operations in any sequence.

In embodiment(s), the data and/or raw data corresponds to a transfer of an application. In other embodiment(s), the data and/or raw data corresponds to a transfer of a virtual machine.

In other embodiment(s), the first data service and/or the second data service corresponds to a cloud-based storage device.

In yet other embodiment(s), a device (e.g., server, data storage device, or other type of storage or computing device) of the system comprises the first data service and the second data service.

Figure 5:
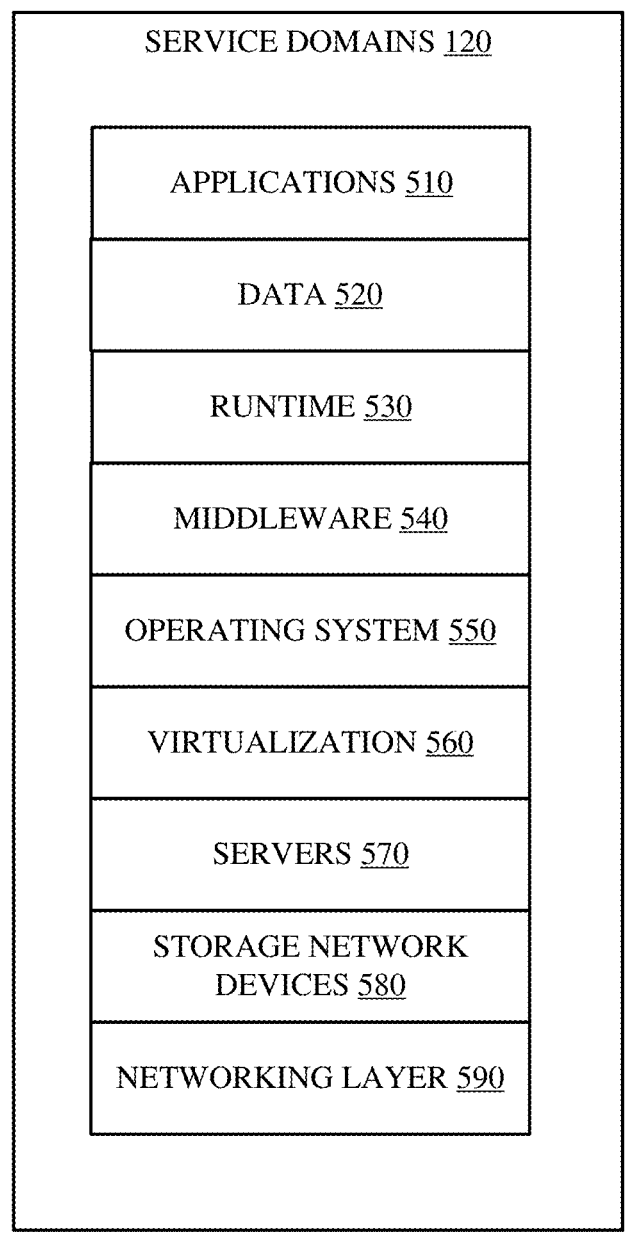
FIG. 5 illustrates a block diagram of different service domains, in accordance with various example embodiments.
Figure 6:
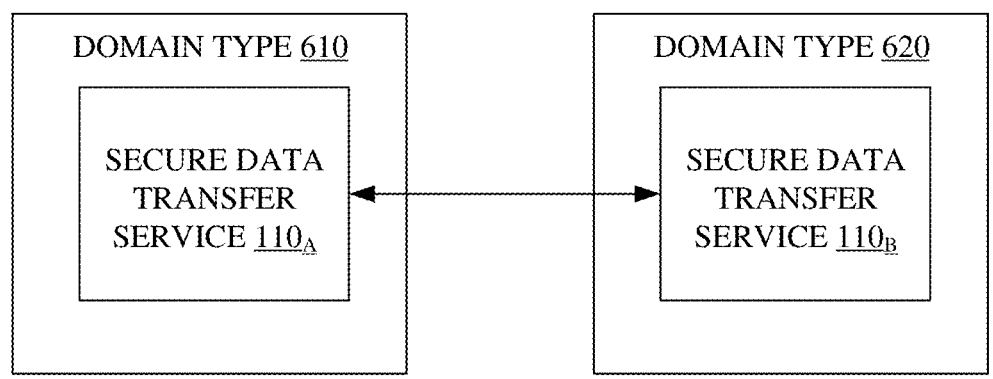
FIG. 6, illustrates a block diagram of a performance of a secure data migration across different types of service domains, in accordance with various example embodiments.
Figure 7:
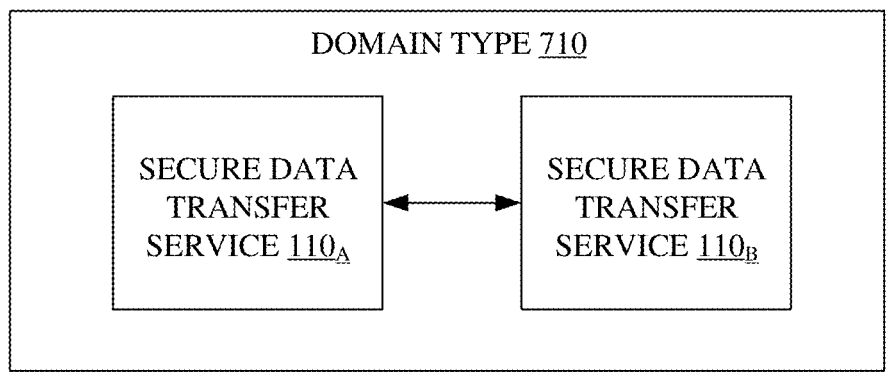
FIG. 7, illustrates a block diagram of a performance of a secure data migration within a service domain, in accordance with various example embodiments.

Referring now to FIGS. 5-7, block diagrams (500-700) of different service domains; a performance of a secure data migration across different types of service domains; and a performance of a secure data migration within a service domain are illustrated, respectively, in accordance with various example embodiments. In embodiment(s), the secure data transfer services perform secure data migration (e.g., within cloud computing environment(s) (101)) in service domains (120) comprising applications (510), data (520), runtime (530), middleware (540), operating system (550), virtualization (560), server(s) (570), storage network devices (580), and networking layer (590).

In embodiment(s), the secure data transfer services perform secure data migration across, between, and/or within the service domains—the service domains corresponding to an on-premises service, IaaS, PaaS, and/or SaaS. For example, as illustrated by FIG. 6, the secure data transfer services can perform secure data migration between different types of service domains—between domain type 610 that is different from domain type 620. In other embodiment(s) illustrated by FIG. 7, the secure data transfer services can perform secure data migration within a common service domain, e.g., domain type 710.

FIGS. 8-13 illustrate methodologies for facilitating, via a secure data migration service, data migration across on-premise and multi-cloud environment(s), in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
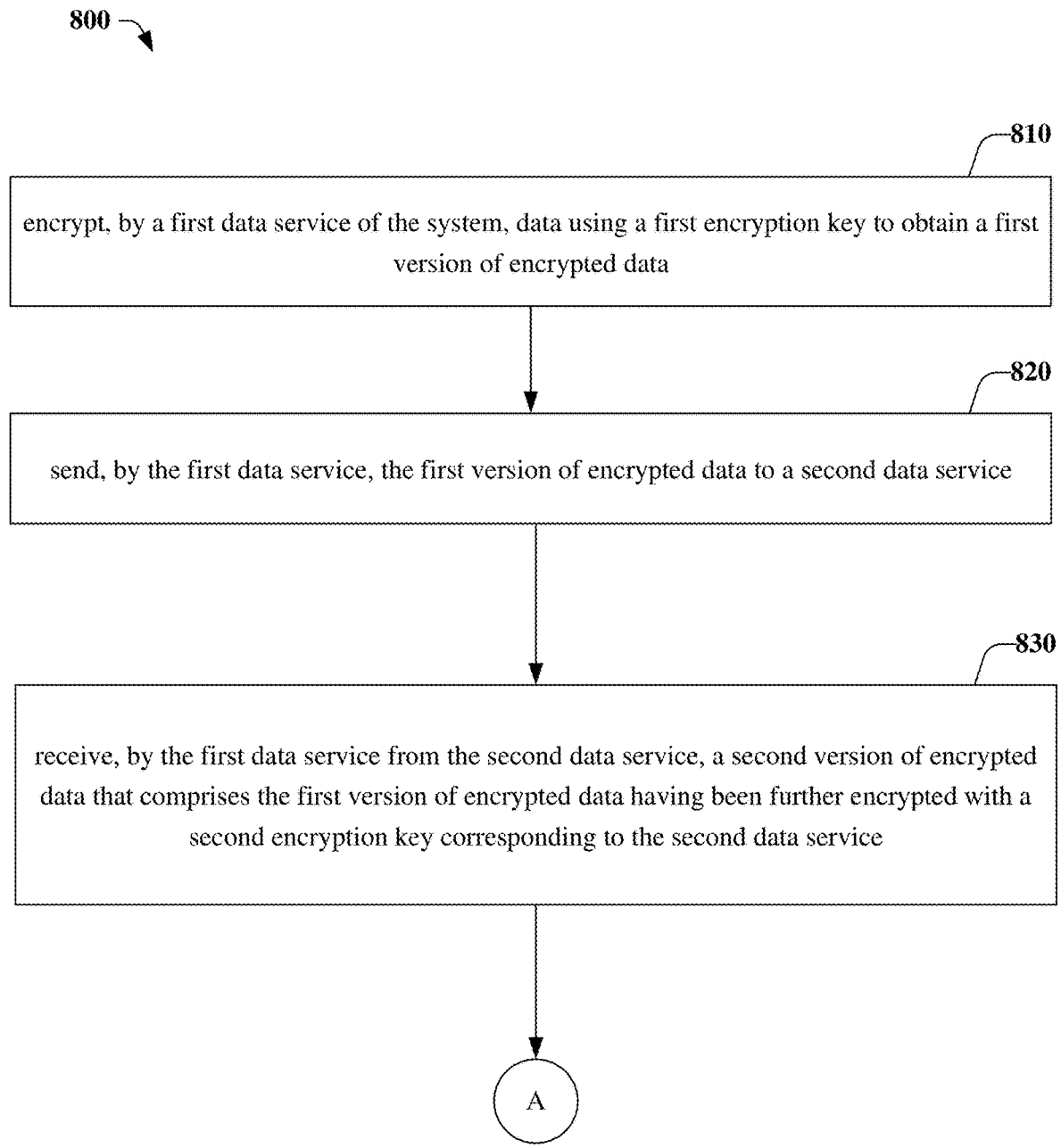
FIGS. 8-9 illustrate flow charts of a method that facilitates secure data migration across and/or within different service domains, in accordance with various example embodiments.
Figure 9:
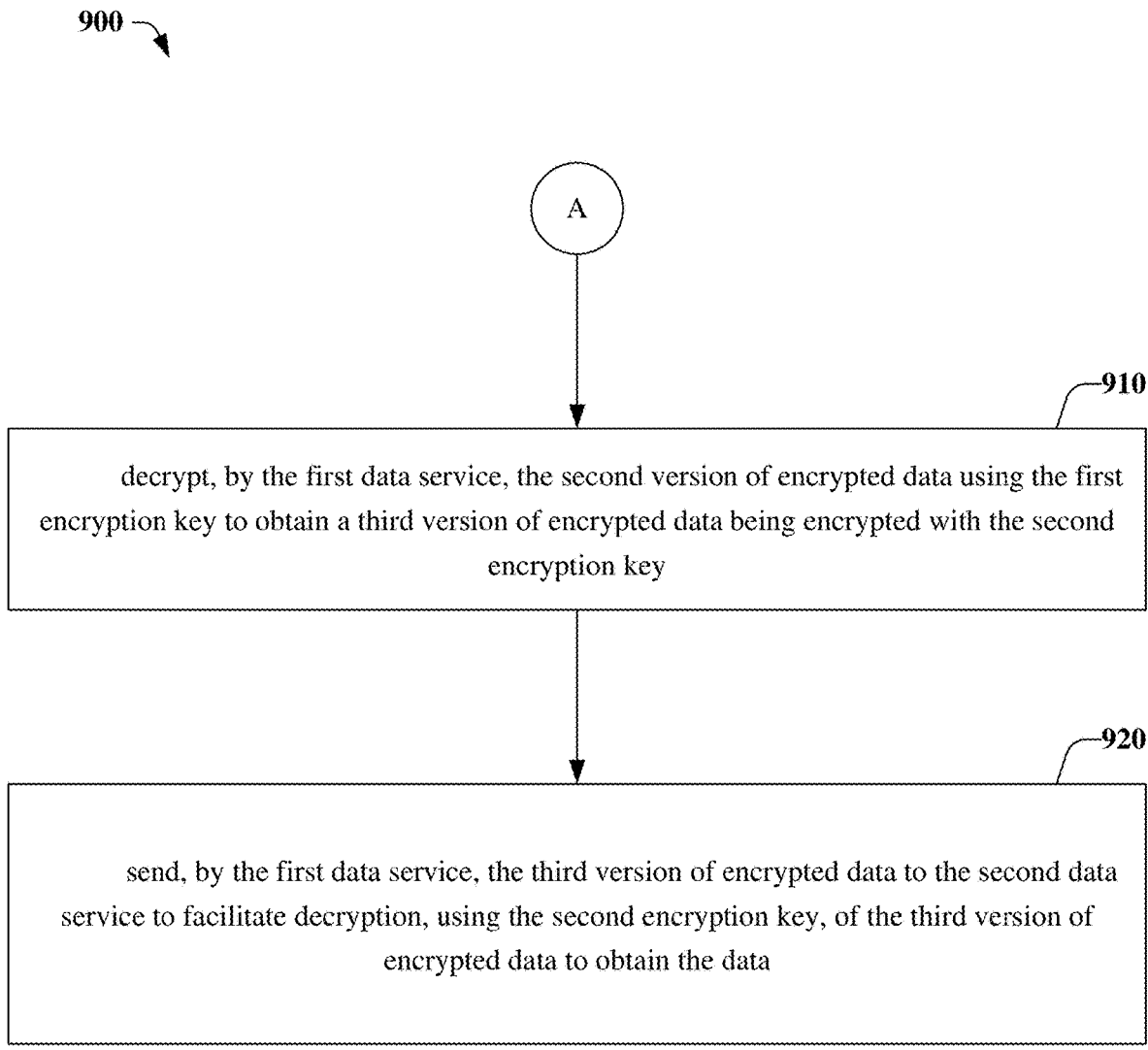
Figure 10:
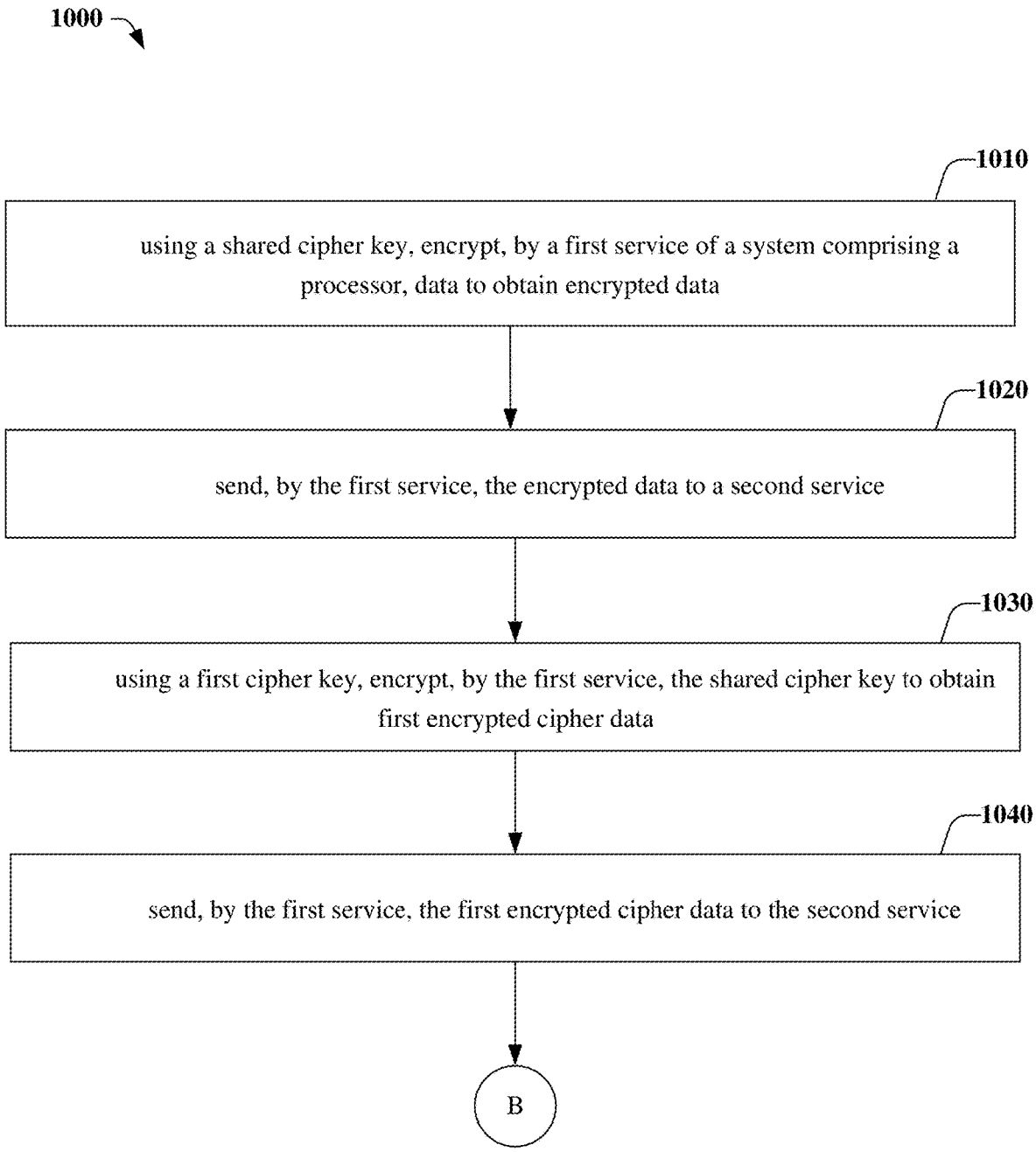
FIGS. 10-11 illustrate flow charts of another method that facilitates secure data migration across and/or within different service domains, in accordance with various example embodiments.
Figure 11:
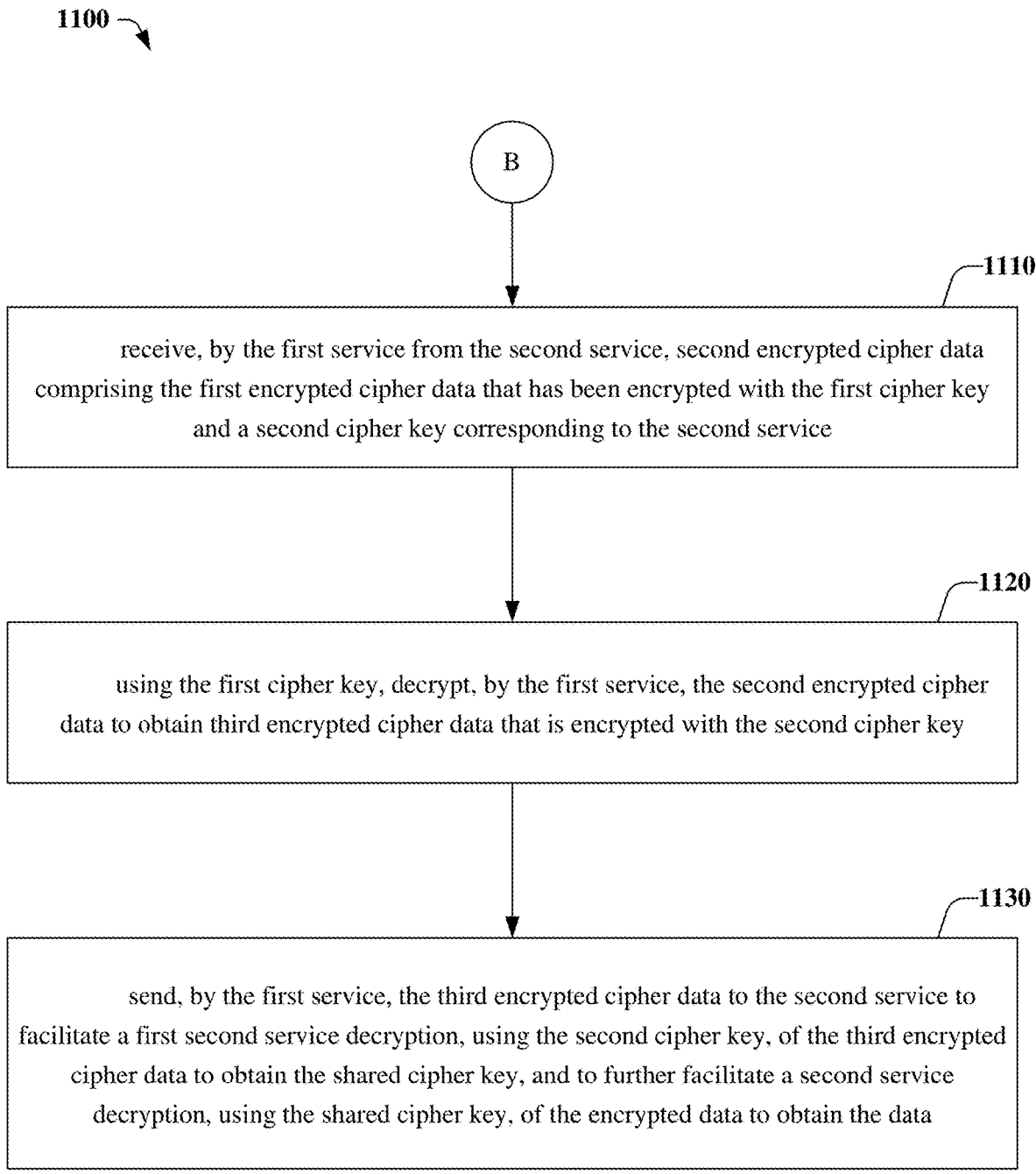

FIGS. 8-9 illustrate flow charts (800-900) of a method that facilitates secure data migration across and/or within different service domains, in accordance with various example embodiments. A 810, a first data service (e.g., 110$_A$, 110$_B$) of a system comprising a processor encrypts data using a first encryption key to obtain a first version of encrypted data.

At 820, the first data service sends the first version of encrypted data to a second data service (e.g., 110$_B$, 110$_A$). At 830, the first data service receives, from the second data service, a second version of encrypted data that comprises the first version of encrypted data having been further encrypted with a second encryption key corresponding to the second data service.

At 910, the first data service decrypts the second version of encrypted data using the first encryption key to obtain a third version of encrypted data being encrypted with the second encryption key. At 920, the first data service sends the third version of encrypted data to the second data service to facilitate decryption, by the second data service using the second encryption key, of the third version of encrypted data to obtain the data Referring now to FIGS. 10-11, flow charts (1000-1100) of another method that facilitates secure data migration across and/or within different service domains are illustrated, in accordance with various example embodiments. At 1010, a first service (e.g., 110$_A$, 110$_B$) of a system comprising a processor uses a shared cipher key to encrypt data to obtain encrypted data. At 1020, the first service sends the encrypted data to a second service (e.g., 110$_B$, 110$_A$). At 1030, the first service uses a first cipher key to encrypt the shared cipher key to obtain first encrypted cipher data. At 1040, the first service sends the first encrypted cipher data to the second service.

At 1110, the first service receives, from the second service, second encrypted cipher data comprising the first encrypted cipher data that has been encrypted with the first cipher key and a second cipher key corresponding to the second service. At 1120, the first service uses the first cipher key to decrypt the second encrypted cipher data to obtain third encrypted cipher data that is encrypted with the second cipher key.

At 1130, the first service sends the third encrypted cipher data to the second service to facilitate a first second service decryption, using the second cipher key, of the third encrypted cipher data to obtain the shared cipher key, and to further facilitate a second service decryption, using the shared cipher key, of the encrypted data to obtain the data.

Figure 12:
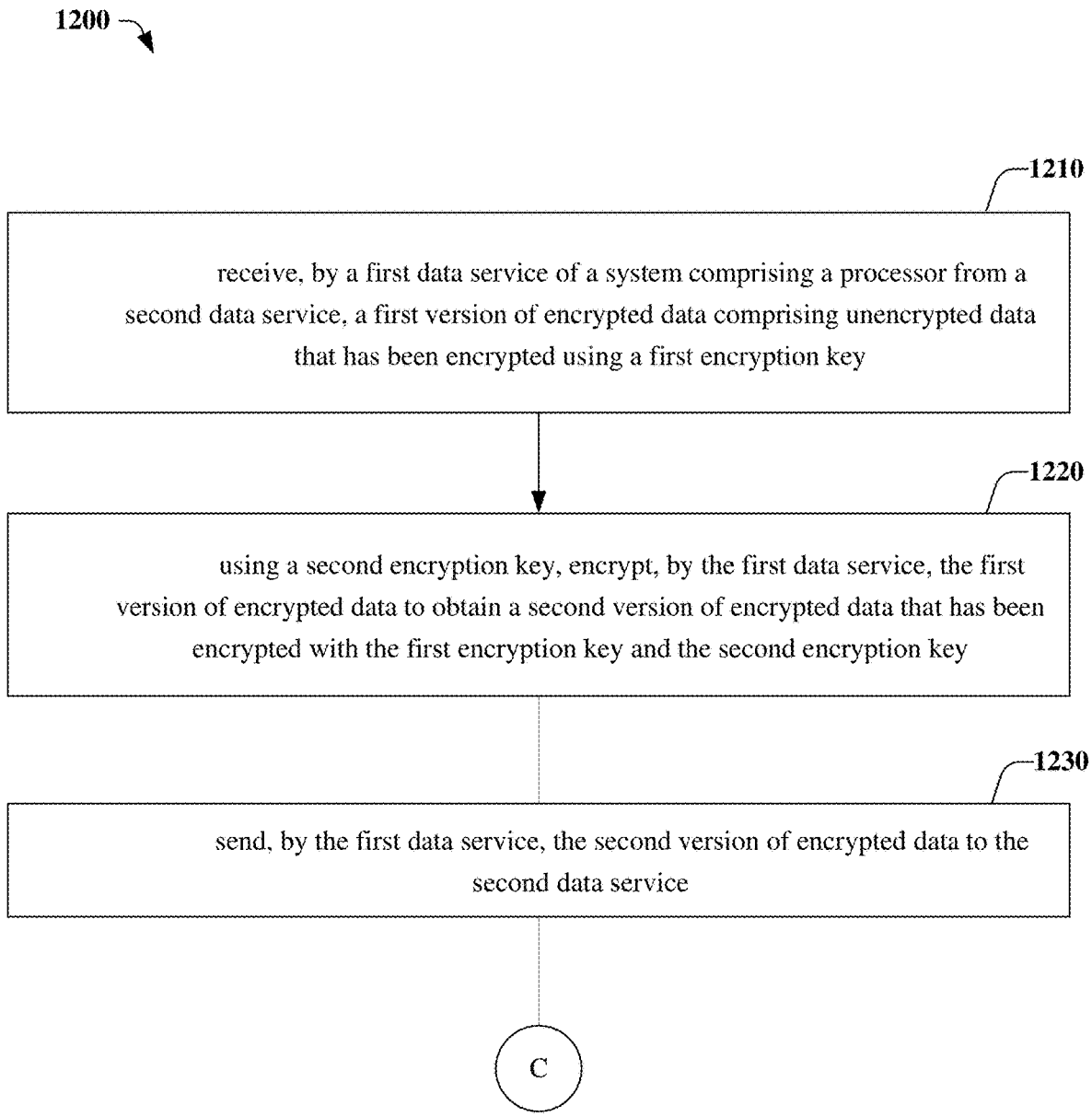
FIGS. 12-13 illustrate flow charts of yet another method that facilitates secure data migration across and/or within different service domains, in accordance with various example embodiments.
Figure 13:
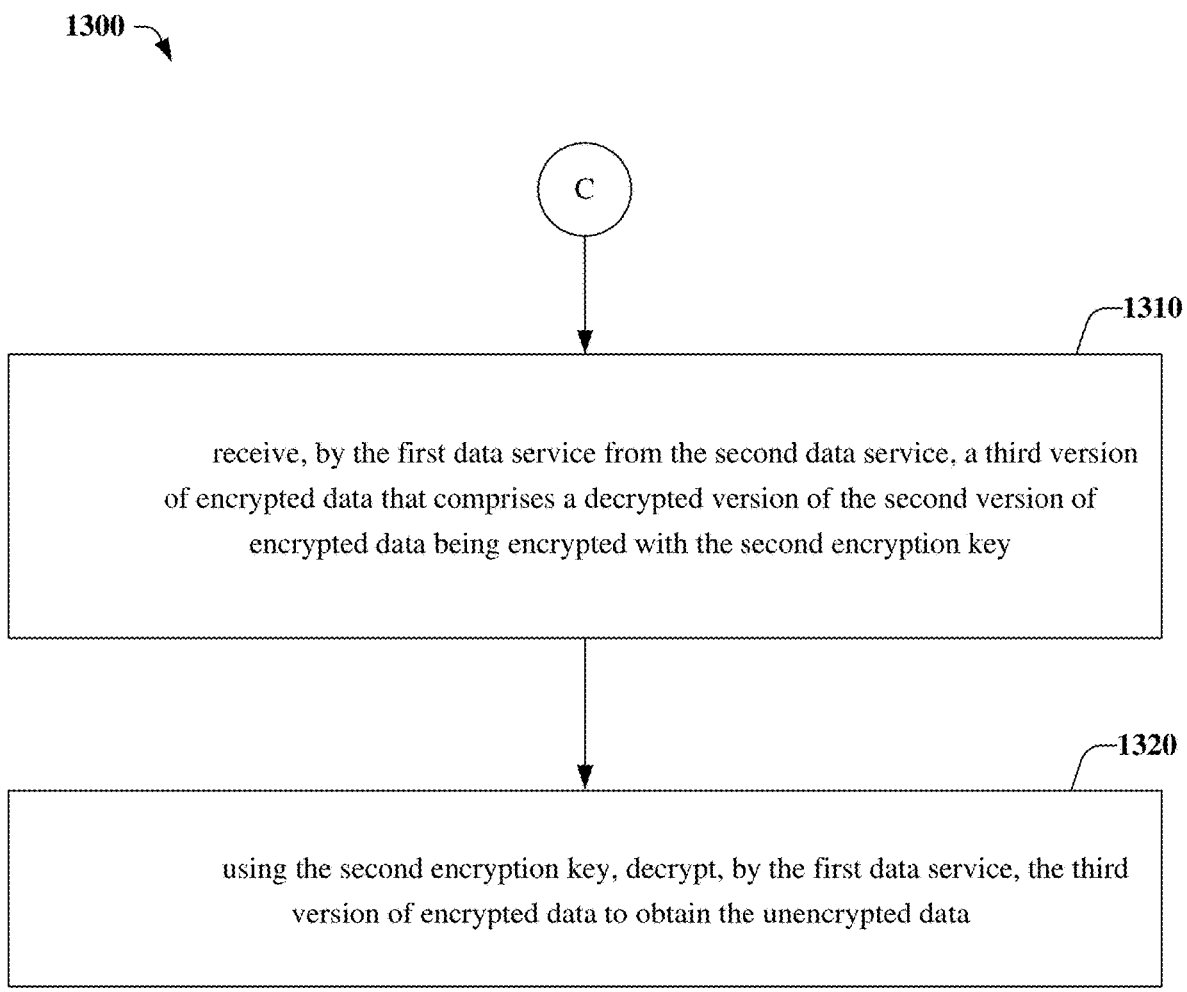

FIGS. 12-13 illustrate flow charts (1200-1300) of yet another method that facilitates secure data migration across and/or within different service domains, in accordance with various example embodiments. At 1210, a first data service (e.g., 110$_B$, 110$_A$) of a system comprising a processor receives, from a second data service (e.g., 110$_A$, 110$_B$), a first version of encrypted data comprising unencrypted data that has been encrypted using a first encryption key.

At 1220, the first data service uses a second encryption key to encrypt the first version of encrypted data to obtain a second version of encrypted data that has been encrypted with the first encryption key and the second encryption key. At 1230, the first data service sends the second version of encrypted data to the second data service.

At 1310, the first data service receives, from the second data service, a third version of encrypted data that comprises a decrypted version of the second version of encrypted data being encrypted with the second encryption key. At 1320, the first data service uses the second encryption key to decrypt the third version of encrypted data to obtain the unencrypted data.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), middleware, and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1422 (see below), disk storage 1424 (see below), and/or memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1420) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
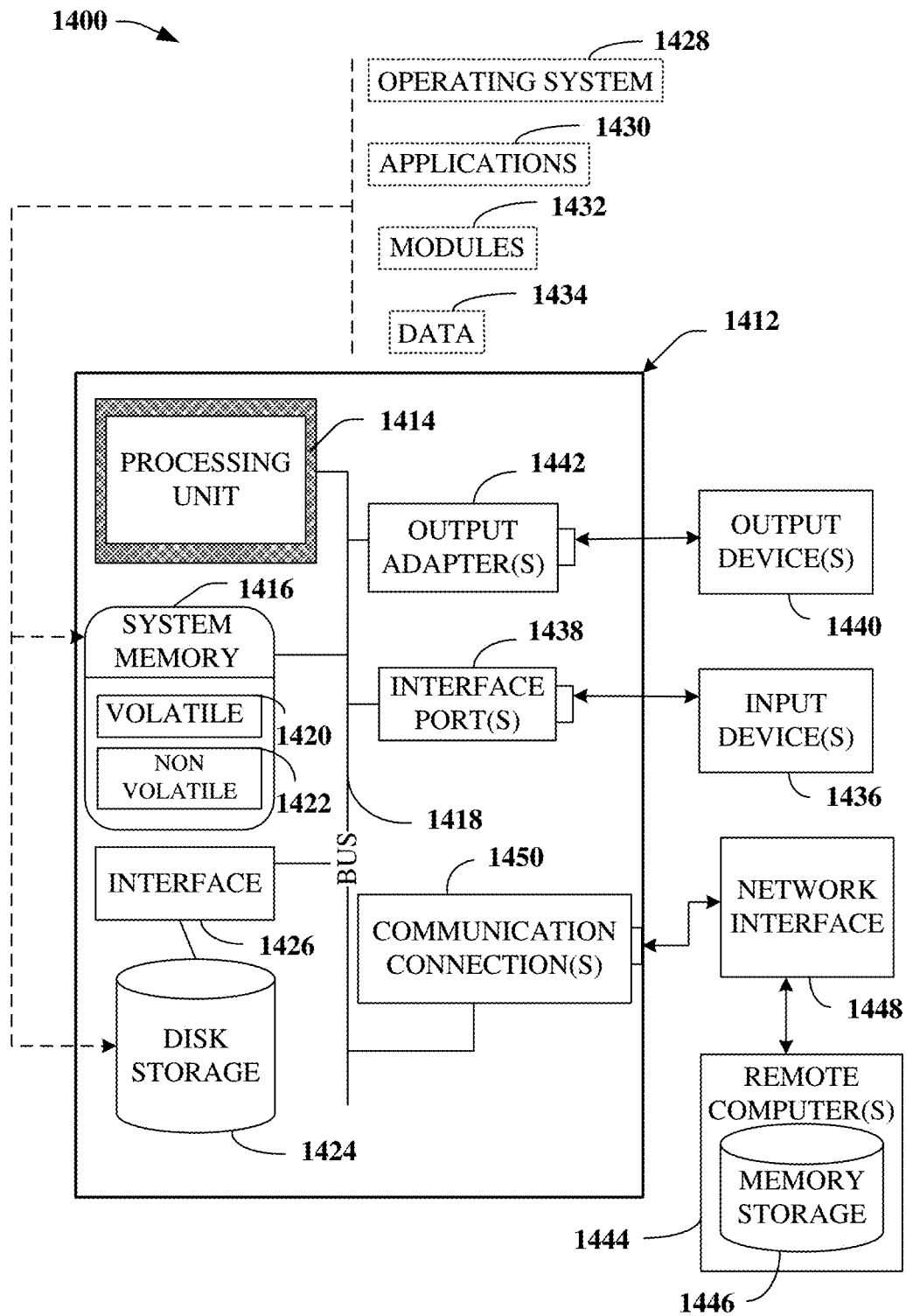
FIG. 14 illustrates a block diagram representing an illustrative non-limiting computing system or operating environment in which one or more aspects of various embodiments described herein can be implemented.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems, methods, and secure data transfer service(s), e.g., via cloud computing environment(s) (101) is illustrated, in accordance with an embodiment. Computer 1412 comprises a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1416 comprises volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can comprise ROM, PROM, EPROM, EEPROM, or flash memory. Volatile memory 1420 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also comprises removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, Jaz drive, Zip drive, LS-100 drive, flash memory card, or memory stick. In addition, disk storage 1424 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user can enter commands or information into computer 1412 through input device(s) 1436. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 comprise, for example, a serial port, a parallel port, a game port, a universal serial bus (USB), a wireless based port, e.g., Wi-Fi, Bluetooth, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 comprise, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically comprises many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A system, comprising:
at least one processor; and
at least one memory that stores executable components that, when executed by the at least one processor, cause the system to perform operations comprising:
encrypting, by a first data service of the system, data using a first encryption key via an encryption process to obtain a first version of encrypted data;
sending, by the first data service, the first version of encrypted data to a second data service;
receiving, by the first data service from the second data service, a second version of encrypted data, wherein the second version of encrypted data comprises the first version of encrypted data having been further encrypted, via the encryption process, with a second encryption key corresponding to the second service;
decrypting, by the first data service, the second version of encrypted data using the first encryption key via a decryption process to obtain a third version of encrypted data being encrypted with the second encryption key; and
sending, by the first data service, the third version of encrypted data to the second service to facilitate a decryption, using the second encryption key via the decryption process, of the third version of encrypted data to obtain the data, wherein the encryption process and the decryption process comprise respective synchronous stream ciphers that are based on exclusive-or (XOR) masks.

2. The system of claim 1, wherein the data comprises raw data, unstructured data, an encryption key, encrypted data, or non-persistent data.

3. The system of claim 1, wherein the first encryption key is different than the second encryption key.

4. The system of claim 1, wherein the first encryption key equals the second encryption key.

5. The system of claim 1, wherein the first encryption key and the second encryption key comprise symmetric cipher keys to facilitate performance of the encryption process or the decryption process in any sequence based on the XOR masks.

6. The system of claim 1, wherein the data comprises a shared encryption key, wherein the decryption is a first decryption, and wherein the encrypting of the data comprises:
   encrypting, by the first data service, the shared encryption key using the first encryption key to obtain the first version of encrypted data;
   encrypting, by the first data service, raw data using the shared encryption key to obtain encrypted raw data; and
   sending, by the first data service, the encrypted raw data to the second data service to facilitate a second decryption, via the second service using the shared encryption key, of the encrypted raw data to obtain the raw data.

7. The system of claim 6, wherein the shared encryption key is the first encryption key.

8. The system of claim 6, wherein the shared encryption key is different than the first encryption key.

9. The system of claim 6, wherein the raw data comprises unstructured data, an encryption key, encrypted data, or non-persistent data.

10. The system of claim 6, wherein the first encryption key, the second encryption key, and the shared encryption key comprise respective symmetric cipher keys to facilitate performance of the encryption process or the decryption process in any sequence.

11. The system of claim 6, wherein the data corresponds to a transfer of an application.

12. The system of claim 6, wherein the data corresponds to a transfer of a virtual machine.

13. The system of claim 6, wherein at least one of the first data service or the second data service corresponds to a cloud-based storage device.

14. The system of claim 6, wherein a device of the system comprises the first data service and the second data service.

15. A method, comprising:
   using a shared cipher key, encrypting, by a first service of a system comprising at least one processor, data to obtain encrypted data;
   sending, by the first service, the encrypted data to a second service;
   using a first cipher key, encrypting, by the first service via an encryption process, the shared cipher key to obtain first encrypted cipher data;
   sending, by the first service, the first encrypted cipher data to the second service;
   receiving, by the first service from the second service, second encrypted cipher data comprising the first encrypted cipher data that has been encrypted, via the encryption process, with the first cipher key and a second cipher key corresponding to the second service;
   using the first cipher key, decrypting, by the first service via a decryption process, the second encrypted cipher data to obtain third encrypted cipher data that is encrypted with the second cipher key; and
   sending, by the first service, the third encrypted cipher data to the second service to facilitate a first second service decryption, using the second cipher key via the decryption process, of the third encrypted cipher data to obtain the shared cipher key, and to further facilitate a second service decryption, using the shared cipher key via the decryption process, of the encrypted data to obtain the data, wherein the encryption process and the decryption process comprise respective synchronous stream ciphers that are based on exclusive-or masks.

16. The method of claim 15, wherein the encrypting of the data comprises:
   encrypting, by the first service, one or more portions of non-persistent data corresponding to a virtual machine.

17. The method of claim 15, wherein at least one of the first service or the second service comprise middleware representing performance of non-operating system-based services.

18. The method of claim 15, wherein the first cipher key and the second cipher key comprise symmetric cipher keys to facilitate performance of the encryption process or the decryption process in any sequence.

19. A non-transitory machine-readable medium comprising instructions that, in response to execution, cause a first service corresponding to a system comprising at least one processor to perform operations, the operations comprising:
   in response to encrypting unencrypted data using a shared cipher key to obtain encrypted data, sending the encrypted data to a second service;
   encrypting, via an encryption process, the shared cipher key using a first cipher key to obtain first encrypted cipher data;
   in response to sending the first encrypted cipher data to the second service, receiving second encrypted cipher data from the second service, wherein the second encrypted cipher data comprises the first encrypted cipher data being encrypted, via the encryption process, with the first cipher key and a second cipher key corresponding to the second service;
   decrypting, via a decryption process, the second encrypted cipher data using the first cipher key to obtain third encrypted cipher data being encrypted with the second cipher key; and
   sending the third encrypted cipher data to the second service to facilitate a first decryption, by the second service via the decryption process, of the third encrypted cipher data using the second cipher key to obtain the shared cipher key, and
   a second decryption, by the second service via the decryption process, of the encrypted data using the shared cipher key to obtain the data, wherein the encryption process and the decryption process comprise respective synchronous stream ciphers that are based on exclusive-or masks.

20. The non-transitory machine-readable medium of claim 19, wherein the first cipher key and the second cipher key comprise symmetric cipher keys to facilitate performance of the encryption process or the decryption process in any order of operations.

* * * * *